US006897903B1

(12) United States Patent
Hu

(10) Patent No.: US 6,897,903 B1
(45) Date of Patent: May 24, 2005

(54) APPARATUS FOR DETECTING MIXED INTERLACED AND PROGRESSIVE ORIGINAL SOURCES IN A VIDEO SEQUENCE

(75) Inventor: Shane Ching-Feng Hu, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 692 days.

(21) Appl. No.: 09/652,071

(22) Filed: Aug. 31, 2000

(51) Int. Cl.[7] .......................... H04N 5/14; H04N 5/46
(52) U.S. Cl. ................................. 348/700; 348/558
(58) Field of Search .......... 375/240.08, 240.01–240.03, 375/240.11, 240.19, 240.21, 240.46; 348/700, 558

(56) References Cited

U.S. PATENT DOCUMENTS

| | | | |
|---|---|---|---|
| 4,982,280 A | | 1/1991 | Lyon et al. |
| 5,365,273 A | * | 11/1994 | Correa et al. ............... 348/452 |
| 5,379,063 A | * | 1/1995 | Kishi et al. ............... 348/208.6 |
| 5,475,438 A | * | 12/1995 | Bretl ........................... 348/452 |
| 5,565,998 A | | 10/1996 | Coombs et al. |
| 5,619,272 A | * | 4/1997 | Salmon et al. ............... 348/452 |
| 5,689,301 A | | 11/1997 | Christopher et al. |
| 5,821,991 A | * | 10/1998 | Kwok .......................... 348/96 |
| 5,850,264 A | | 12/1998 | Agarwal |
| 6,041,142 A | | 3/2000 | Rao et al. |
| 6,266,349 B1 | * | 7/2001 | Fukui et al. ................ 370/515 |
| 6,563,550 B1 | * | 5/2003 | Kahn et al. ................. 348/700 |
| 6,571,255 B1 | * | 5/2003 | Gonsalves et al. ....... 707/104.1 |

* cited by examiner

Primary Examiner—Chris Kelley
Assistant Examiner—Dave Czekaj
(74) Attorney, Agent, or Firm—Thorp Reed & Armstrong, LLP

(57) ABSTRACT

A method and apparatus of identifying the source of materials in a video sequence is disclosed. A series of pseudo frames is formed, for example by interleaving, from fields in adjacent frames. A correlation value is calculated for each of the pseudo frames. The correlation value may be a sum of absolute difference (SAD) of luminance values of every neighboring scan line accumulated over the entire pseudo frame. Scene changes may be determined, for example, based on the correlation values. Frames and repeated fields are identified based on the correlation values and the scene changes. Finally, the source of each frame in the series is identified based on the identification of frames and repeated fields.

78 Claims, 2 Drawing Sheets

APPARATUS FOR DETECTING MIXED INTERLACED AND PROGRESSIVE ORIGINAL SOURCES IN A VIDEO SEQUENCE

BACKGROUND OF THE INVENTION

1. Field of the Invention

The present invention is related to the field of video signal processing and, more particularly, to methods and apparatus for identifying whether a video signal originated by means of a film source or a video camera source.

2. Description of the Background

Film and television image generation systems give rise to the appearance to the viewer of continuously moving visual images. Actually, the appearance of continuous motion results from visual and mental integration by the viewer of rapidly advancing sequences of still frame images.

Conventionally, in countries having a 60 hertz power grid, motion picture films are generated and are projected at one frame rate, such as 24 film frames per second, while television images are generated and displayed at another frame rate, such as 30 television frames per second.

Each individual frame is made up of fields. The fields are typically produced in one of two ways. The fields may be interlaced, i.e. one field being made up of even numbered lines and the other field being made up of odd numbered lines, or the fields may be progressive, i.e. one line scanned after another. For example, in the standard NTSC format used for television, the 30 frames per second are comprised of 60 interlaced fields per second, or more precisely 59.94 fields per second within the NTSC color standard signal format.

A video sequence may contain a mixture of interlaced video and converted progressive film material. The film material is typically sampled at 24 hertz while video is sampled at different rates: 59.94 hertz for the NTSC standard, and 50 hertz for the D1-525 and D1-625 standards. A telecine, a device for scanning and converting film into video, must maintain a proper sequence duration between the different frame rates. To do so, either a 3/2 or 2/2 pull-down technique is used to stretch the display period of film frames to the target video standard. In the 3/2 pull-down process, one film frame is used to produce three video fields, and the next film frame is used to produce two fields, in a repeating 3/2 pattern. Thus, the 3/2 pull-down is used to convert two film frames into five video fields for the D1-525 video standard. In the 212 pull-down system, each film frame generates two video fields, one of each type (odd/even).

When receiving video information that was originally produced on film, there is an opportunity for performing essentially error-free de-interlacing of the signal. That is because each frame of the film source is used in generating at least two video fields, representing both types (odd/even) of interlaced fields. Therefore, if a video signal can be reliably determined to have originated on film, and the video fields corresponding to a common film frame can be identified, an essentially error-free non-interlaced video frame corresponding to a single instant in time can be generated by merging the two fields. Other uses of film source identification include identification of redundant fields (which occur in 3/2 pull-down sources) to be deleted in digital transmission systems for improving channel efficiency. Also, to display video in a progressive monitor, each field needs to be interpolated vertically to the full frame size. For the film-source video, the best way to de-interlace is to merge the two fields back together to reconstruct the original progressive film frame and discard any extra repeated field.

Unfortunately, no special information is included in broadcast or other video signals to indicate which fields may have originated on film and which fields may have originated in a video camera, so the presence of film-based material must be inferred by examining differences between the luminance information of fields. That, however, can present a number of problems. For example, a strong similarity between successive video fields could indicate that they were generated from the same film frame; it could also be due to a lack of movement in the program material. Likewise, a difference between fields may indicated that the fields did not come from the same frame of information, but the difference could also be due to vertical spatial detail or transmission noise. A practical film detector must therefor distinguish between the foregoing situations.

U.S. Pat. No. 5,689,301 discloses a method of film mode identification which comprises concurrently providing a first pixel from a given field and second and third vertically aligned pixels of the same horizontal position from a temporally adjacent field. The values of the pixels are compared to produce for each first pixel, a pixel difference signal having a value of zero if the value of the first pixel is intermediate the values of the second and third pixels. Otherwise, the difference signal has a value equal to the absolute value of the difference between the value of the first pixel and the value of one of the second and third pixels having a value closest to that of the first pixel. Non-zero values of the pixel difference signals are accumulated over a predetermined portion of one field period of the video signal to provide a field difference signal. The accumulated values are then analyzed for a pattern indicative of a film source of the video signal.

Despite advances in the field of identifying original film sources, the need exists for a practical detector which can correctly detect the occurrences of film sources in video sequences, which may contain an arbitrary mix of interlaced and progressive sources.

SUMMARY OF THE PRESENT INVENTION

The present invention is directed to a method and apparatus of identifying the source of materials in a video sequence. A series of pseudo frames is formed, for example by interleaving, from fields in adjacent frames. A correlation value is calculated for each of the pseudo frames. The correlation value may be a sum of absolute difference (SAD) of luminance values of every neighboring scan line accumulated over the entire pseudo frame. Scene changes may be determined, for example, based on the correlation values. Frames and repeated fields are identified based on the correlation values and the scene changes. Finally, the source of each frame in the series is identified based on the identification of frames and repeated fields.

The apparatus and method of the present invention detect whether each field in a video sequence is of video (interlaced) or film (progressive) origin, and whether the field is a repeated field of the previous progressive frame. It also determines whether the field is a starting field for a new scene in the video sequence. Such information is useful for data transmission and display purposes. Those, and other advantages and benefits, will become apparent from the description of the preferred embodiment hereinbelow.

BRIEF DESCRIPTION OF THE DRAWINGS

For the Present invention to be readily understood and easily practiced, the present invention will now be described, for purposes of illustration and not limitation, in conjunction with the following figures wherein:

FIG. 3 is a flow chart illustrating a method for determining the source of video sequences according to the present invention.

DESCRIPTION OF THE PREFERRED EMBODIMENTS

Figure 1:
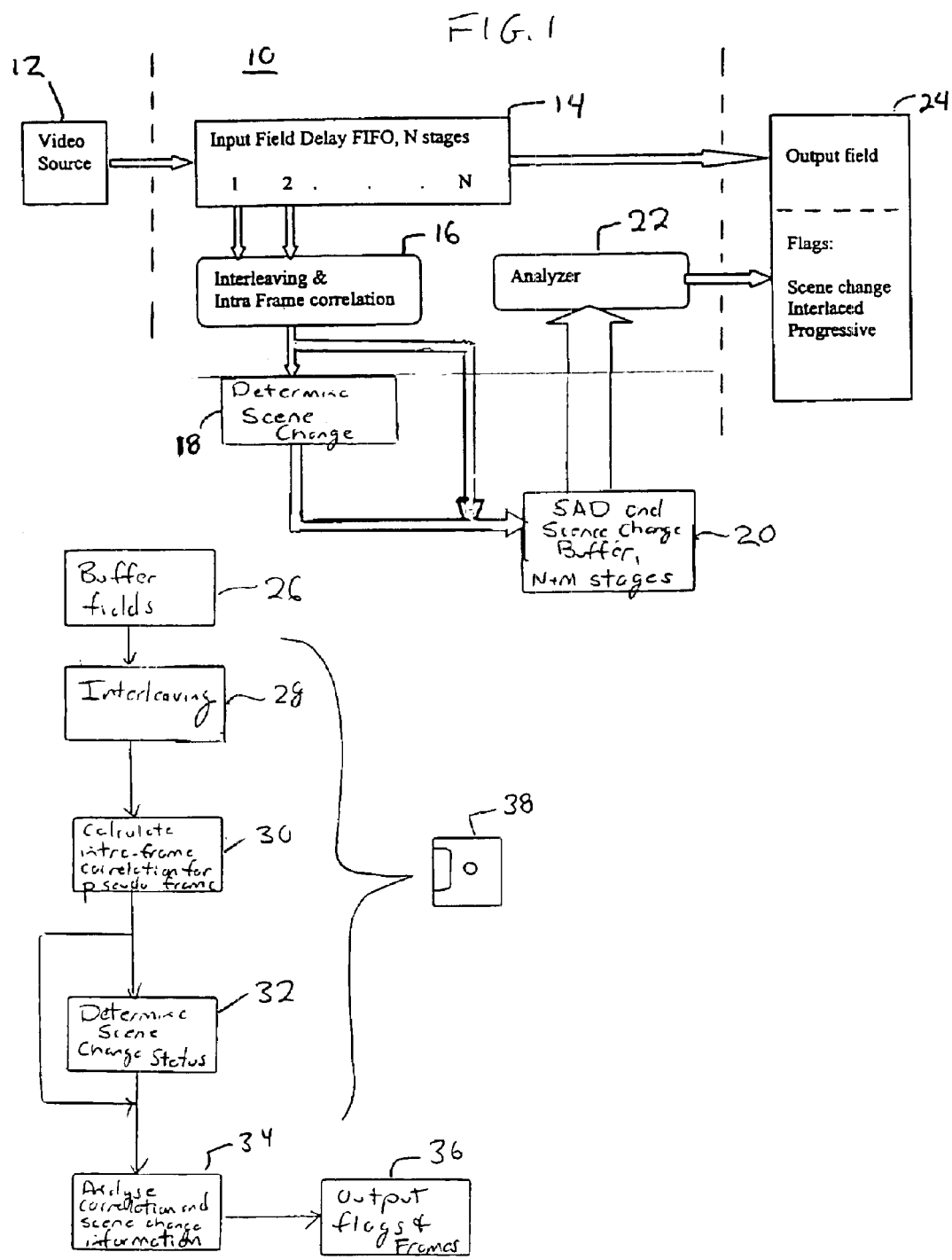
FIG. 1 is a block diagram of an apparatus for determining the source of video sequences constructed according to the present invention.

FIG. 1 is a block diagram of a detection apparatus 10 constructed according to the present invention for determining the source of video sequences. An external source 12 of video sequences of unknown origin provides a video sequence to the detection apparatus 10. External source 12 conforms to standard industry interfaces and provides input video sequences which may consist of an arbitrary mix of video and film source origin. The detection apparatus 10 may be operated in real time, in which case detection is done on the fly, or operated off-line.

The detection apparatus 10 is comprised of a field delay FIFO buffer 14 with a capacity of N fields. The buffer 14 typically has a minimum value for N of 4. However, if time and space are of no concern, i.e., offline non real-time systems, longer delay can be incorporated to provide more robust detection. The buffer 14 serves as a look ahead buffer for the intra-frame correlation measurements discussed next.

A circuit 16 interleaves each field with the previous field to form a pseudo frame. An intra-frame correlation (SAD) is calculated by the circuit 16 for the pseudo-frame as follows.

$$SAD = \sum_{i=0}^{Y-2} \sum_{j=0}^{X-1} |P_{i,j} - P_{i+1,j}|$$

where SAD is the sum of absolute value of neighboring line differences, Y is the total number of lines in the pseudo frame, X is the total number of pixels in a line, $P_{ij}$ is the luminance value of a pixel. The sum of the differences is a commonly used measure of correlation. Other measures can be used, including a higher power of this measure.

A circuit 18 is responsive to the intra-frame correlation SAD values. When the intra-frame correlation SAD value is higher than the previous SAD value multiplied by a pre-determined constant, a scene change is declared for the current input field. Thus:

```
If(SAD[1]>(SAD[2] * K))
    Scene_change[1] = TRUE;
else
    Scene_change[1] = FALSE;
``` where K is a pre-determined constant. The scene change status is recorded along with the SAD value in a buffer 20.

The buffer 20 may have a capacity of N+M stages, and is synchronized with the shifting of the fields within the FIFO buffer 14. The extra M stages of buffering for the SAD values are required by an analyzer 22 to handle scene changes. The value of M may equal N-1.

The analyzer 22 is responsive to the buffer 20. For a pseudo frame having progressive characteristics, the intra-frame SAD has a much lower value than a pseudo frame of either interlaced origin or a pseudo frame that straddles two progressive frames. That fact forms the basis for the discrimination between interlaced and progressive source videos.

The FIFO buffer 14 provides the ability to look ahead, which is necessary for the beginning of a new scene and is also used for the continuation of a scene. Accordingly, the values of SAD[i] (i from N-1 to 1) that are used by the analyzer 22 for new scenes and for continuation of scenes are P1=SAD[N-1], P2=SAD[N-2], P3=SAD[N-3]. The values {P1, P2, P3} are inputs to the analyzer 22.

For the tail end of a scene, the values of SAD[i], (i from N+1 to N+M) are used. The tail-end condition is met if there is any scene change status being "TRUE" for scene_change [k], (k from 1 to N-1). In that case, P1=SAD[N], P2=SAD [N+1], P3=SAD[N+2]. The values {P1, P2, P3} are inputs to the analyzer 22.

The analyzer 22 compares the values of P1, P2, and P3 as formulated above in accordance with, for example, the following equations:

```
If (Pi < (Pj * Kframe))
    Is_frame = TRUE;
else
    Is_frame = FALSE;
If (Pj < (Pk * Kframe))
    Is_frame = TRUE;
else
    Is_frame = FALSE;
``` where "Kframe" is a pre-determined constant.

```
If ((Pi, Pk "is_frame") and (Pj, Pk "is_frame"))
    Is_repeated_field = TRUE;
else
    Is_repeated_field = FALSE;
```

With the is_frame and is_repeated_frame determinations made, the remainder of the functions of the analyzer 22 may be implemented with, for example, a state machine implementing the following state transition table:

| Current state | Condition | Next State |
|---|---|---|
| Interlaced | {P1, P2} "is_frame" and {P3, P2} "is_frame" | Prog_2_1 |
|  | {P1, P2, P3} "is_repeated_field" | Prog_3_1 |
|  | None of the above | Interlaced |
| Prog_2_1 | Already pre-determined | Prog_2_2 |
| Prog_2_2 | {P1, P2} "is_frame" and {P3, P2} "is_frame" | Prog_2_1 |
|  | {P1, P2, P3} "is_repeated_field" | Prog_3_1 |
|  | None of the above | Interlaced |
| Prog_3_1 | Already pre-determined | Prog_3_2 |
| Prog_3_2 | Already pre-determined | Prog_3_3 |
| Prog_3_3 | {P1, P2} "is_frame" and {P3, P2} "is_frame" | Prog_2_1 |
|  | {P1, P2, P3} "is_repeated_field" | Prog_3_1 |
|  | None of the above | Interlaced |

Where:
Interlaced means an interlaced field;
Prog_2_1 means the first field of a progressive frame;

Prog_2_2 means the second field of a progressive frame;

Prog_3_1 means the first field of a repeated field progressive frame;

Prog_3_2 means the second field of a repeated field progressive frame; and

Prog_3_3 means the third field of a repeated field progressive fame.

Figure 2:
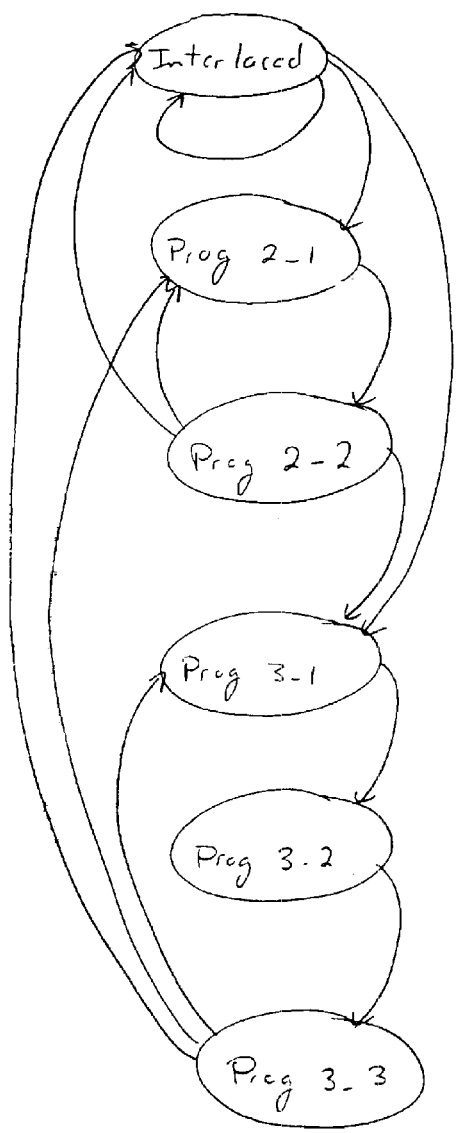
FIG. 2 is a diagram illustrating the states of a state machine used to implement certain of the functions of the analyzer of FIG. 1.

The state transitions shown in the previous table are graphically illustrated in FIG. 2.

Returning to FIG. 1, synchronized with each field 24 output from the FIFO buffer 14, the analyzer 22 determines the output field's 24 characteristics and outputs a flag based on the next state in the state transition table indicating whether the output field 24 is a starting field of a new scene and format of the field, i.e.:

interlaced field (interlaced), or

The first field of a progressive frame (Prog_2_1), or

The second field of a progressive frame (Prog_2_2), or

The first field of a repeated field progressive frame (Prog_3_1), or

The second field of a repeated field progressive frame (Prog_3_2), or

The third field of a repeated field progressive frame (Prog_3_3).

The detecting apparatus 10 starts to output video fields 24, and the flags associated with each field, after the delay interposed by the FIFO buffer 14. Typical examples of video systems which can benefit from the information provided are progressive video display devices, MPEG2 video compressor, etc.

The present invention is also directed to a method of detecting mixed interlaced and progressive original sources in a video sequence. The method of the present invention is illustrated in FIG. 3. The first step of the method 26 is to buffer incoming fields. Buffering of the incoming fields is needed to select the values P1, P2 and P3 later in the process, and is also needed to enable the interleaving, at step 28, of adjacent fields to provide a pseudo frame.

After the pseudo frames have been created, through interleaving at step 28 or otherwise, an intra-frame correlation is calculated at step 30. One intra-frame correlation which may be used is based on the sum of absolute value of neighboring line differences as discussed above.

At step 32, scene changes are identified when the intra-frame correlation value is higher than a previous intra-frame correlation value multiplied by a predetermined constant. Other methods of determining when a scene changes may be used. However, because the intra-frame correlation values are available, using those values to determine scene changes is particularly advantageous.

Step 34 corresponds to the analyzer 22 of FIG. 1. In step 34, the intra-frame correlations are made available as well as the scene change information. Based on those two pieces of information, the values P1, P2 and P3 are selected and compared to one another. The basis of the comparison is a recognition that the intra-frame correlation for a pseudo frame is much lower than the intra-frame correlation of either an interlaced original or a pseudo frame that straddles two progressive frames. Based on that comparison a state machine may be used to determine the type of frame.

At step 36, frames, which are buffered at step 26, are output and synchronization with the output of information from step 34. Information may be output at step 34 in the form of flags that indicate whether the output field is a starting field of a new scene together with the format of the field.

Figure 4:
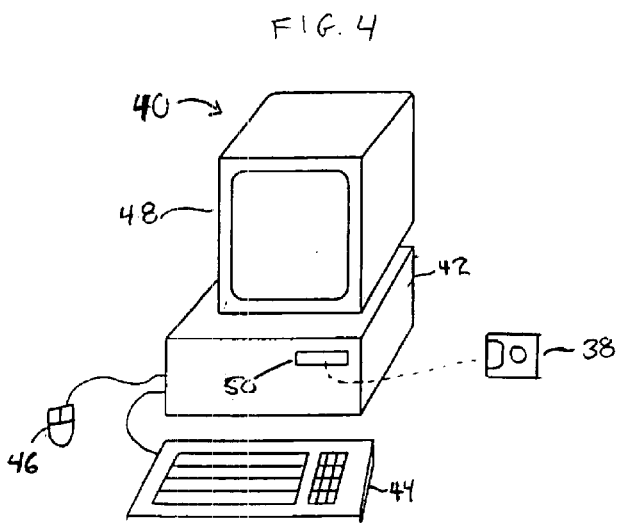
FIG. 4 illustrates a system upon which the method of the present invention may be practiced.

The method of the present invention may be embodied in software and stored, for example, on a disc 38, on a computer's hard drive (not shown), or other computer readable media. The disc 38 may be used to control the operation of a computer system, such as system 40 illustrated in FIG. 4. System 40 may be comprised of a general purpose computer 42, a keyboard 44, mouse 46 and a monitor 48. Other types of input devices (scanners, microphones, etc.) and other types of output devices (speakers, printers, etc.) may be used depending upon the needs of the user. The computer 42 has a disc drive 50 for receiving the disc 38.

The present invention may also be implemented in a hardware specific implementation controlled by an application specific integrated circuit (ASIC) programmed to carry out the method as described above.

While the present invention has been described in conjunction with preferred embodiments thereof, those of ordinary skill in the art will recognize that many modifications and variations may be made. For example, other methods may be employed for creating pseudo fields. Additionally, other types of correlations may be used to generate intra-frame values for the pseudo frames. Depending upon the correlation used, the operation of the analyzer may need to be adjusted to correspond to the input information. All such modifications and variations are intended to be covered by the foregoing description and the following claims.

What is claimed is:

1. A method of identifying the source of materials in a video sequence, comprising:

forming a series of pseudo frames by combining fields;

calculating an intra-frame correlation value for each of said pseudo frames;

determining scene changes;

selecting a first set of intra-frame correlation values when a current pseudo frame represents a new scene or a continuation of a scene;

selecting a second set of intra-frame correlation values when the current pseudo frame represents an end of a scene wherein intra-frame correlation values in said first and said second sets are non-overlapping; and analyzing a corresponding one of said first set or said second set of correlation values to identify the source of each frame in said series.

2. The method of claim 1 wherein said forming a series of pseudo-frames includes interleaving each field with a field from a previous frame.

3. The method of claim 1 wherein said forming a series of pseudo-frames includes interleaving each field with a previous field.

4. The method of claim 1 wherein calculating a correlation value includes calculating a sum of absolute values of neighboring line differences according to the following formula:

$$SAD = \sum_{i=0}^{Y-2} \sum_{j=0}^{X-1} |P_{i,j} - P_{i+1,j}|.$$

5. The method of claim 1 wherein said determining scene changes includes comparing a correlation value for one pseudo frame to a correlation value for an adjacent pseudo-frame multiplied by a constant.

6. The method of claim 5 wherein said adjacent pseudo-frame includes a previous pseudo-frame.

7. The method of claim 1 wherein said analyzing includes:

comparing said selected first set or second set of correlation values to one another to identify the source of each frame in said series.

8. The method of claim 7 wherein said identification of the source of each frame includes transitioning a state machine through a series of states based on said comparison.

9. The method of claim 1 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

10. The method of claim 1 additionally comprising buffering in a delay buffer a plurality of frames prior to said forming.

11. The method of claim 10 additionally comprising outputting source information in synchronization with the output of frames from said delay buffer.

12. The method of claim 1 wherein said method is carried out in real time.

13. The method of claim 1 wherein said method is carried out off-line.

14. A method of identifying the source of materials in a video sequence, comprising:
 forming a series of pseudo frames by combining fields;
 calculating an intra-frame correlation value for each of said pseudo frames;
 determining scene changes based on said correlation values;
 selecting a first set of intra-frame correlation values when a current pseudo frame represents anew scene or a continuation of a scene;
 selecting a second set of intra-frame correlation values when the current pseudo frame represents an end of a scene, wherein intra-frame correlation values in said first and said second sets are non-overlapping;
 identifying frames and repeated fields based on said first set or said second set of correlation values; and
 identifying the source of each frame in said series based on said identification of frames and repeated fields.

15. The method of claim 14 wherein said forming a series of pseudo-frames includes interleaving each field with a field from a previous frame.

16. The method of claim 14 wherein said forming a series of pseudo-frames includes interleaving each field with a previous field.

17. The method of claim 14 wherein said calculating a correlation value includes calculating a sum of absolute values of neighboring line differences according to the following formula:

$$SAD = \sum_{i=0}^{Y-2} \sum_{j=0}^{X-1} |P_{i,j} - P_{i+1,j}|$$

18. The method of claim 14 wherein said determining scene changes includes comparing a correlation value for one pseudo frame to a correlation value for an adjacent pseudo-frame multiplied by a constant.

19. The method of claim 18 wherein said adjacent pseudo-frame includes a previous pseudo-frame.

20. The method of claim 14 wherein said identification of frames and repeated fields includes:
 comparing said selected first set or second set of correlation values to one another to identify frames and repeated fields.

21. The method of claim 14 wherein said identification of the source of each frame includes transitioning a state machine through a series of states based on said frames and repeated fields.

22. The method of claim 14 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

23. The method of claim 14 additionally comprising buffering in a delay buffer a plurality of frames prior to said forming.

24. The method of claim 23 additionally comprising outputting source information in synchronization with the output of frames from said delay buffer.

25. The method of claim 14 wherein said method is carried out in real time.

26. The method of claim 14 wherein said method is carried out off-line.

27. A computer readable medium carrying a series of instructions which, when executed, perform a method of identifying the source of materials in a video sequence, comprising:
 forming a series of pseudo frames by combining fields;
 calculating an intra-frame correlation value for each of said pseudo frames;
 determining scene changes;
 selecting a first set of intra-frame correlation values when a current pseudo frame represents a new scene or a continuation of a scene;
 selecting a second set of intra-frame correlation values when the current pseudo frame represents an end of a scene, wherein intra-frame correlation values in said first and said second sets are non-overlapping; and
 analyzing a corresponding one of said first set or said second set of correlation values to identify the source of each frame in said series.

28. The medium of claim 27 wherein said forming a series of pseudo-frames includes interleaving each field with a field from a previous frame.

29. The medium of claim 27 wherein said forming a series of pseudo-frames includes interleaving each field with a previous field.

30. The medium of claim 27 wherein calculating a correlation value includes calculating a sum of absolute values of neighboring line differences according to the following formula:

$$SAD = \sum_{i=0}^{Y-2} \sum_{j=0}^{X-1} |P_{i,j} - P_{i+1,j}|$$

31. The medium of claim 27 wherein said determining scene changes includes comparing a correlation value for one pseudo frame to a correlation value for an adjacent pseudo-frame multiplied by a constant.

32. The medium of claim 31 wherein said adjacent pseudo-frame includes a previous pseudo-frame.

33. The medium of claim 27 wherein said analyzing includes:
 comparing said selected first set or second set of correlation values to one another to identify the source of each frame in said series.

34. The medium of claim 33 wherein said identification of the source of each frame includes transitioning a state machine through a series of states based on said comparison.

35. The medium of claim 27 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

36. The medium of claim 27 additionally comprising buffering in a delay buffer a plurality of frames prior to said forming.

37. The medium of claim 36 additionally comprising outputting source information in synchronization with the output of frames from said delay buffer.

38. The medium of claim 27 wherein said method is carried out in real time.

39. The medium of claim 27 wherein said method is carried out off-line.

40. A computer readable medium carrying a series of instructions which, when executed, perform a method of identifying the source of materials in a video sequence, comprising:
 forming a series of pseudo frames by combining fields;
 calculating an intra-frame correlation value for each of said pseudo frames;
 determining scene changes based on said correlation values;
 selecting a first set of intra-frame correlation values when a current pseudo frame represents a new scene or a continuation of a scene;
 selecting a second set of intra-frame correlation values when the current pseudo frame represents an end of a scene, wherein intra-frame correlation values in said first and said second sets are non-overlapping;
 identifying frames and repeated fields based on said first set or said second set of correlation values; and
 identifying the source of each frame in said series based on said identification of frames and repeated fields.

41. The medium of claim 40 wherein said forming a series of pseudo-frames includes interleaving each field with a field from a previous frame.

42. The medium of claim 40 wherein said forming a series of pseudo-frames includes interleaving each field with a previous field.

43. The medium of claim 40 wherein said calculating a correlation value includes calculating a sum of absolute values of neighboring line differences according to the following formula:

$$SAD = \sum_{i=0}^{Y-2} \sum_{j=0}^{X-1} |P_{i,j} - P_{i+1,j}|$$

44. The medium of claim 40 wherein said determining scene changes includes comparing a correlation value for one pseudo frame to a correlation value for an adjacent pseudo-frame multiplied by a constant.

45. The medium of claim 44 wherein said adjacent pseudo-frame includes a previous pseudo-frame.

46. The medium of claim 40 wherein said identification of frames and repeated fields includes:
 comparing said selected first set or second set of correlation values to one another to identify frames and repeated fields.

47. The medium of claim 40 wherein said identification of the source of each frame includes transitioning a state machine through a series of states based on said frames and repeated fields.

48. The medium of claim 40 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

49. The medium of claim 40 additionally comprising buffering in a delay buffer a plurality of frames prior to said forming.

50. The medium of claim 49 additionally comprising outputting source information in synchronization with the output of frames from said delay buffer.

51. The medium of claim 40 wherein said method is carried out in real time.

52. The medium of claim 40 wherein said method is carried out off-line.

53. An apparatus for identifying the source of materials in a video sequence, comprising:
 a first circuit for forming a series of pseudo frames by combining fields;
 a second circuit for calculating an intra-frame correlation value for each of said pseudo frames;
 a third circuit for determining scene changes;
 a fourth circuit for selecting a first set of intra-frame correlation values when a current pseudo frame represents a new scene or a continuation of a scene;
 said fourth circuit for selecting a second set of intra-frame correlation values when the current pseudo frame represents an end of a scene, wherein intra-frame correlation values in said first and said second sets are non-overlapping; and
 an analyzer for analyzing a corresponding one of said first set or said second set of correlation values to identify the source of each frame in said series.

54. The apparatus of claim 53 wherein said first circuit forms a series of pseudo-frames by interleaving each field with a field from a previous frame.

55. The apparatus of claim 53 wherein said first circuit forms a series of pseudo-frames by interleaving each field with a previous field.

56. The apparatus of claim 53 wherein said second circuit calculates a correlation value by calculating a sum of absolute values of neighboring line differences according to the following formula:

$$SAD = \sum_{i=0}^{Y-2} \sum_{j=0}^{X-1} |P_{i,j} - P_{i+1,j}|$$

57. The apparatus of claim 53 wherein said third circuit determines scene changes by comparing a correlation value for one pseudo frame to a correlation value for an adjacent pseudo-frame multiplied by a constant.

58. The apparatus of claim 57 wherein said adjacent pseudo-frame includes a previous pseudo-frame.

59. The apparatus of claim 53 wherein said analyzer:
 compares said selected first set or second set of correlation values to one another to identify the source of each frame in said series.

60. The apparatus of claim 59 wherein said analyzer includes a state machine for transitioning through a series of states based on said comparison.

61. The apparatus of claim 53 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

62. The apparatus of claim 53 additionally comprising a delay buffer to which said first circuit is responsive.

63. The apparatus of claim 62 wherein said analyzer operates in synchronization with said delay buffer.

64. The apparatus of claim 53 wherein said apparatus operates in real time.

65. The apparatus of claim 53 wherein said apparatus operates off-line.

66. An apparatus for identifying the source of materials in a video sequence, comprising:
   a first circuit for forming a series of pseudo frames by combining fields;
   a second circuit for calculating an intra-frame correlation value for each of said pseudo frames;
   a third circuit for determining scene changes based on said correlation values;
   a fourth circuit for selecting a first set of intra-frame correlation values when a current pseudo frame represents a new scene or a continuation of a scene;
   said fourth circuit for selecting a second set of intra-frame correlation values when the current pseudo frame represents an end of a scene, wherein intra-frame correlation values in said first and said second sets are non-overlapping;
   an analyzer for identifying frames and repeated fields based on said first set or said second set of correlation values and for identifying the source of each frame in said series based on said identification of frames and repeated fields.

67. The apparatus of claim 66 wherein said first circuit forms a series of pseudo-frames by interleaving each field with a field from a previous frame.

68. The apparatus of claim 66 wherein said first circuit forms a series of pseudo-frames by interleaving each field with a previous field.

69. The apparatus of claim 66 wherein said second circuit calculates a correlation value by calculating a sun of absolute values of neighboring line differences according to the following formula:

$$SAD = \sum_{i=0}^{Y-2} \sum_{j=0}^{X-1} |P_{i,j} - P_{i+1,j}|$$

70. The apparatus of claim 66 wherein said third circuit determines scene changes by comparing a correlation value for one pseudo frame to a correlation value for an adjacent pseudo-frame multiplied by a constant.

71. The apparatus of claim 70 wherein said adjacent pseudo-frame includes a previous pseudo-frame.

72. The apparatus of claim 66 wherein said analyzer:
   compares said selected first set or second set of correlation values to one another to identify frames and repeated fields.

73. The apparatus of claim 66 wherein said analyzer includes a state machine for transitioning through a series of states based on said identification of frames and repeated fields.

74. The apparatus of claim 66 wherein the identifying the source of materials includes identifying one of an interlaced field, the first field of a progressive frame, the second field of a progressive frame, the first field of a repeated field progressive frame, the second field of a repeated field progressive frame, and the third field of a repeated field progressive frame.

75. The apparatus of claim 66 additionally comprising a delay buffer to which said first circuit is responsive.

76. The apparatus of claim 75 wherein said analyzer operates in synchronization with said delay buffer.

77. The apparatus of claim 66 wherein said apparatus operates in real time.

78. The apparatus of claim 66 wherein said apparatus operates off-line.

* * * * *

UNITED STATES PATENT AND TRADEMARK OFFICE
CERTIFICATE OF CORRECTION

PATENT NO. : 6,897,903 B1
APPLICATION NO. : 09/652071
DATED : May 24, 2005
INVENTOR(S) : Shane Ching-Feng Hu It is certified that error appears in the above-identified patent and that said Letters Patent is hereby corrected as shown below:

Column 1, Line 50, delete "212" and replace it with --2/2--

Column 6, Lines 53 - 57, the formula should appear as follows:

$$SAD = \sum_{i=0}^{Y-2} \sum_{j=0}^{X-1} \left| P_{i,j} - P_{i+1,j} \right|.$$

Column 7, Lines 50 - 54, the formula should appear as follows:

$$SAD = \sum_{i=0}^{Y-2} \sum_{j=0}^{X-1} \left| P_{i,j} - P_{i+1,j} \right|.$$

Column 8, Lines 50 - 53, the formula should appear as follows:

$$SAD = \sum_{i=0}^{Y-2} \sum_{j=0}^{X-1} \left| P_{i,j} - P_{i+1,j} \right|.$$

Column 9, Lines 48 - 50, the formula should appear as follows:

$$SAD = \sum_{i=0}^{Y-2} \sum_{j=0}^{X-1} \left| P_{i,j} - P_{i+1,j} \right|.$$

Column 10, Lines 47 - 51, the formula should appear as follows:

$$SAD = \sum_{i=0}^{Y-2} \sum_{j=0}^{X-1} \left| P_{i,j} - P_{i+1,j} \right|.$$

Column 12, Line 2, delete "sun" and replace it with --sum--.

UNITED STATES PATENT AND TRADEMARK OFFICE
CERTIFICATE OF CORRECTION

| | |
|---|---|
| PATENT NO. | : 6,897,903 B1 |
| APPLICATION NO. | : 09/652071 |
| DATED | : May 24, 2005 |
| INVENTOR(S) | : Shane Ching-Feng Hu |

It is certified that error appears in the above-identified patent and that said Letters Patent is hereby corrected as shown below:

Column 12, Lines 6 - 9, the formula should appear as follows:

$$SAD = \sum_{i=0}^{Y-2} \sum_{j=0}^{X-1} |P_{i,j} - P_{i+1,j}|.$$

Signed and Sealed this

First Day of May, 2007

JON W. DUDAS
*Director of the United States Patent and Trademark Office*